United States Patent [19]

Singer et al.

[11] Patent Number: 5,660,317

[45] Date of Patent: Aug. 26, 1997

[54] EXOTHERMIC WELDING JIG, MOLDS THEREFOR AND METHOD

[75] Inventors: Richard E. Singer, Beachwood; Curtis R. Stidham, Parma; Robert McPherson, Jr., Aurora; Thomas M. Dedo, Independence; Michael A. Spychola, Northfield Center, all of Ohio

[73] Assignee: Erico International Corporation, Solon, Ohio

[21] Appl. No.: 381,640

[22] Filed: Jan. 31, 1995

[51] Int. Cl.⁶ .................................................. B23K 23/00
[52] U.S. Cl. ............... 228/44.3; 164/342; 164/DIG. 12; 228/234.3; 266/167
[58] Field of Search .............................. 228/198, 234.3, 228/33, 44.3; 164/53, 54, DIG. 12, 339, 342; 266/167

[56] References Cited

U.S. PATENT DOCUMENTS

| | | | |
|---|---|---|---|
| 1,607,508 | 11/1926 | Bottrill | 164/54 |
| 3,004,310 | 10/1961 | Burke | 22/116 |
| 3,022,554 | 2/1962 | Burke | 22/116 |
| 3,113,359 | 12/1963 | Burke | 22/116 |
| 3,234,603 | 2/1966 | Leuthy et al. | 22/58 |
| 3,255,498 | 6/1966 | Leuthy et al. | 22/58 |
| 5,145,106 | 9/1992 | Moore et al. | 228/241 |
| 5,533,662 | 7/1996 | Stidham et al. | 228/33 |

OTHER PUBLICATIONS

Article Cadweld® Electrical Connections, Materials And Tools, Section A, pp. A1–A8, 1989, Erico Products Inc.

*Primary Examiner*—Samuel M. Heinrich
*Attorney, Agent, or Firm*—Renner, Otto, Boisselle, Sklar

[57] ABSTRACT

An exothermic welding jig, molds for the jig, and a method of forming and manipulating the mold parts is disclosed. Upper and lower mold parts are included with a crucible fitted on and clamped to the upper mold part. The upper mold part and crucible may be moved as a unit to open and close the mold and also inverted when open for cleaning and inspection. The crucible can quickly be removed or snapped in place for mold or crucible change out. The jig will fit in cramped quarters and has a handle which may be used as a cane or supporting device. A toggle opens and closes the mold set and will hold the molds at any position where released. A mold system with diagonal sleeving makes it easier to form X-connections and other connections in tight or restrictive locations. The method includes the attachment and manipulative steps.

34 Claims, 6 Drawing Sheets

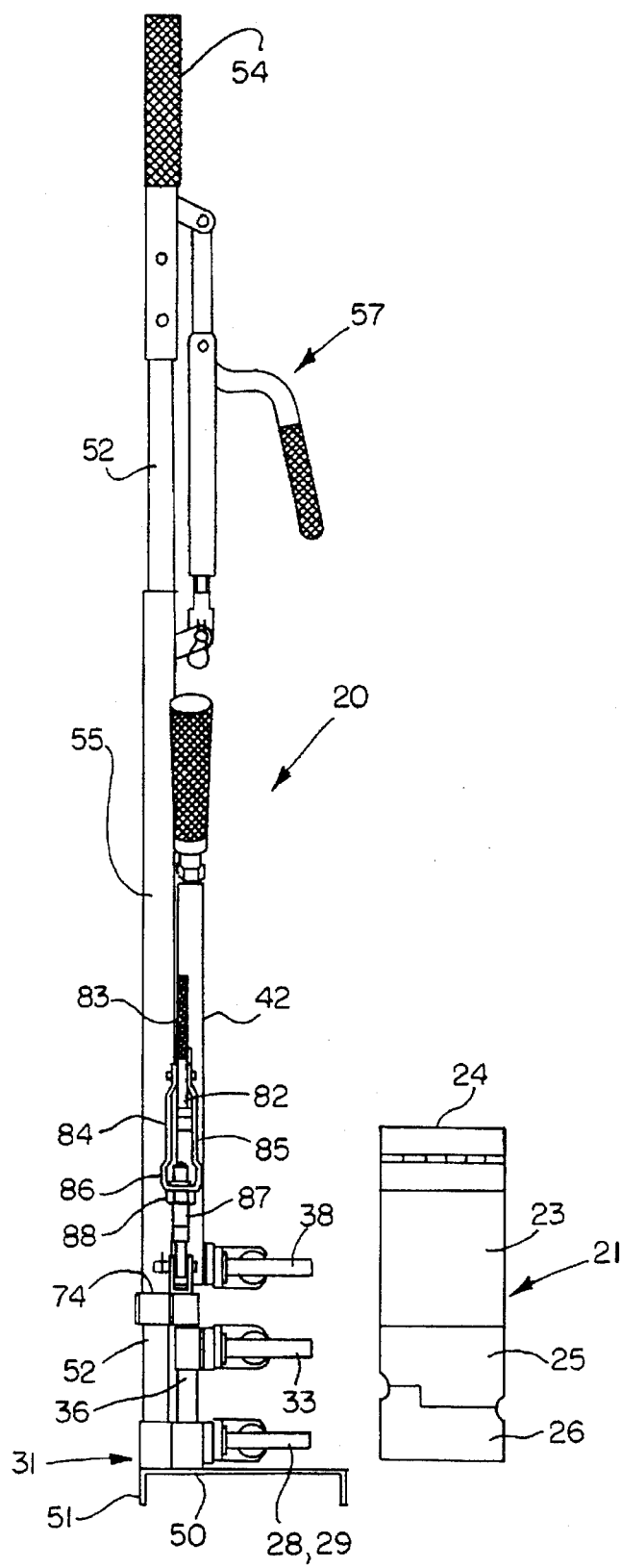

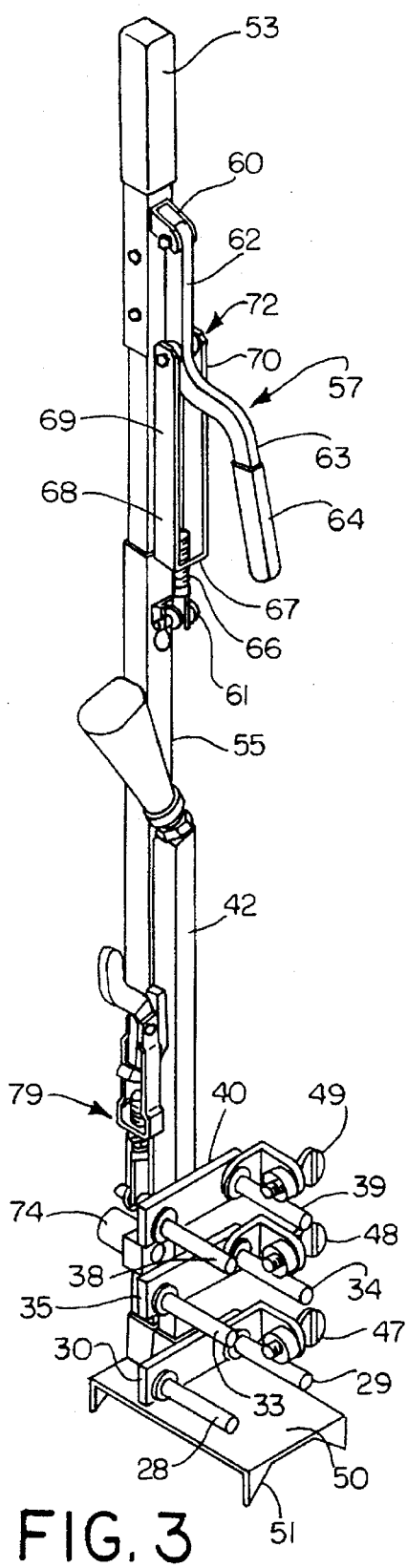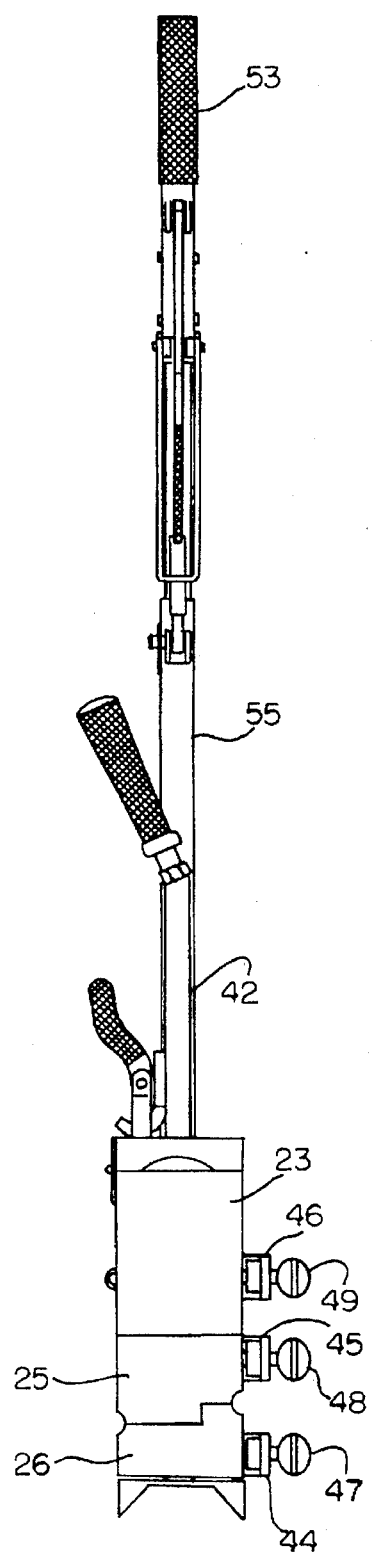
FIG. 3
FIG. 4

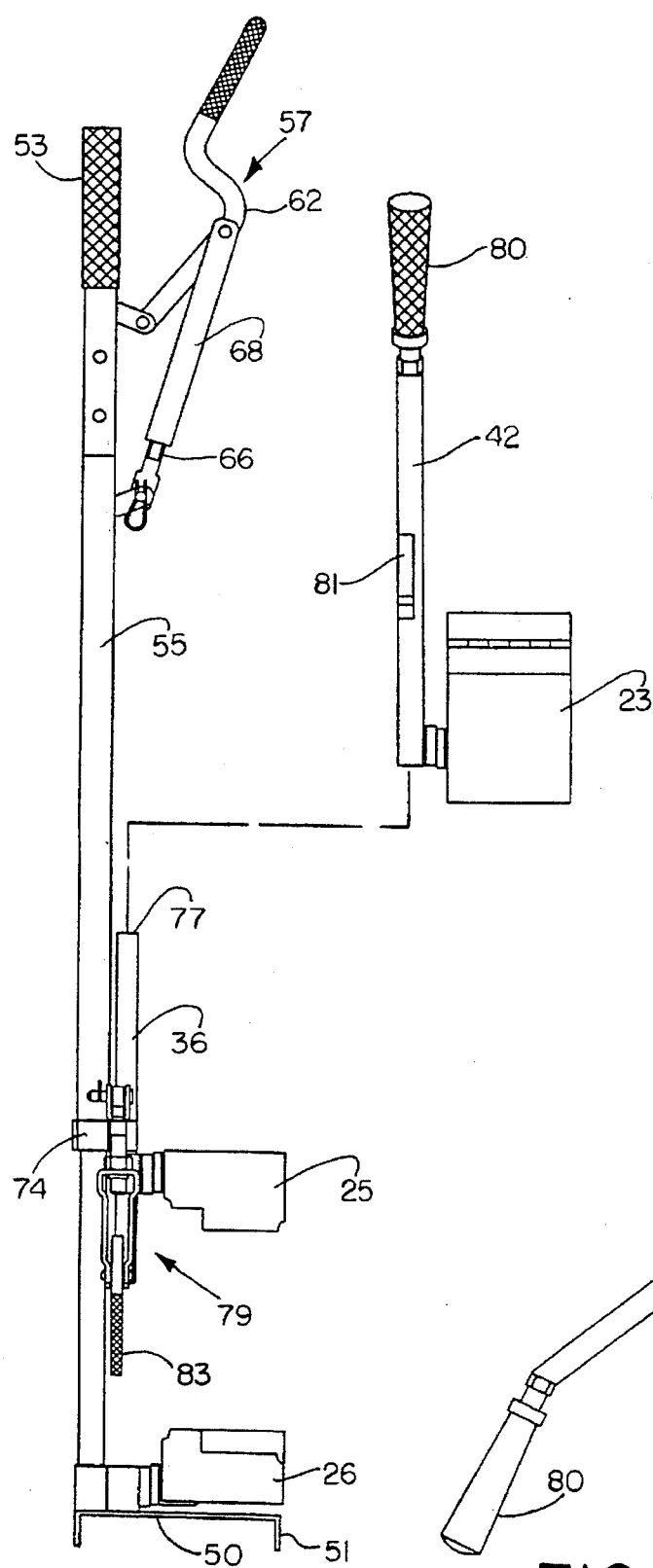
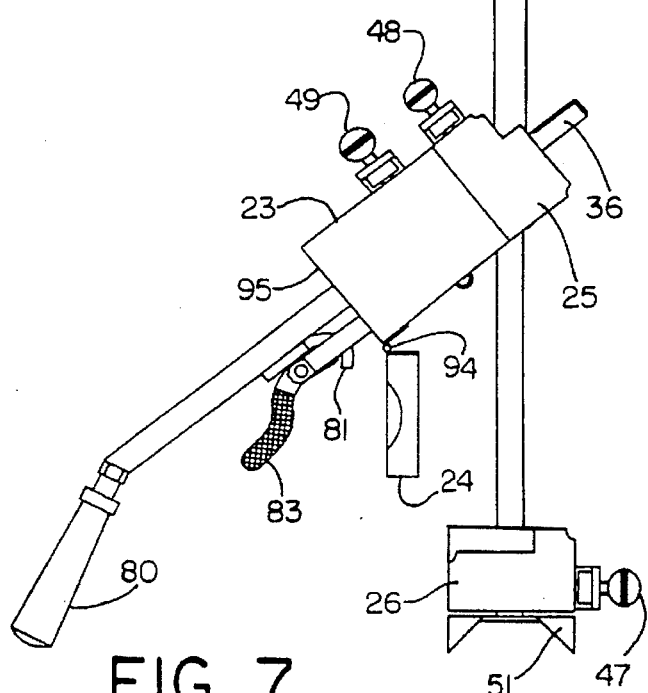
FIG. 8
FIG. 7

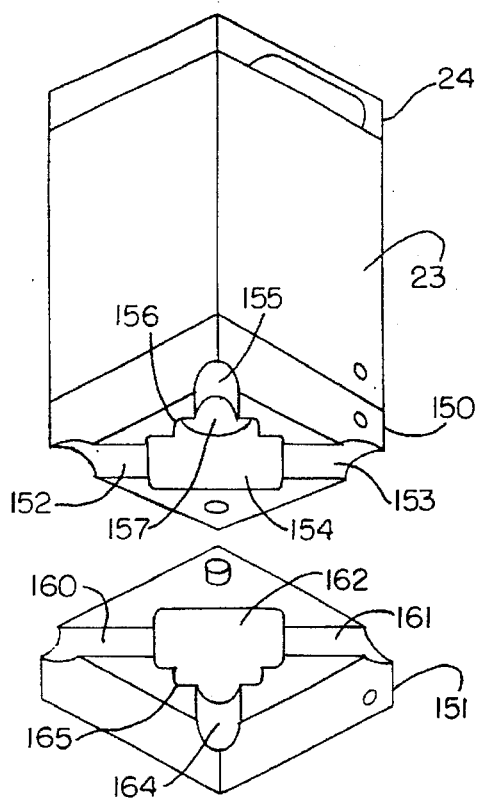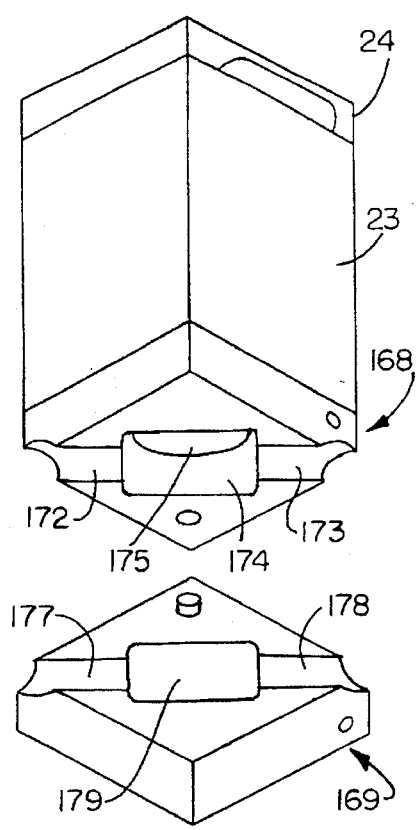
FIG. 15
FIG. 16
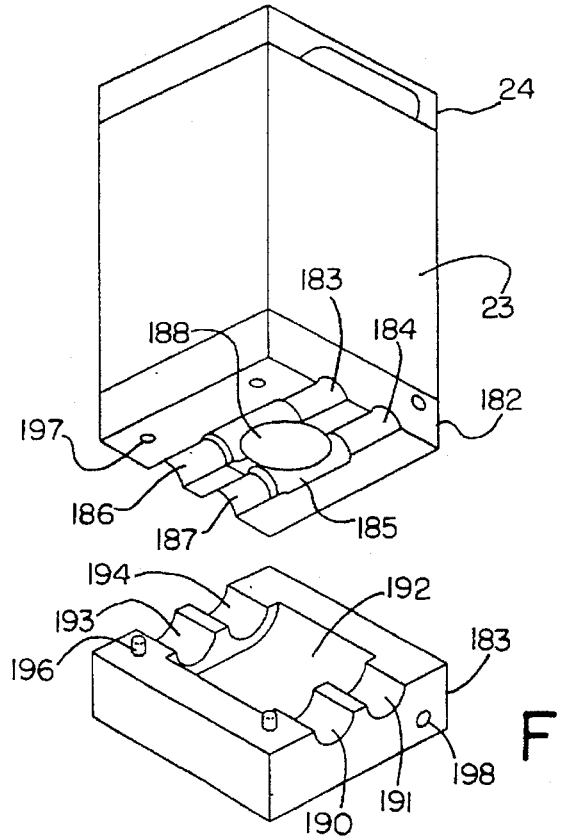
FIG. 17

5,660,317

1

EXOTHERMIC WELDING JIG, MOLDS THEREFOR AND METHOD

DISCLOSURE

This invention relates generally as indicated to an exothermic welding jig, molds for use with the jig, and a method of exothermic welding.

BACKGROUND OF THE INVENTION

Exothermic welding has been widely employed in the formation of electrical connections or in the welding of steel such as rails and in joining reinforcing bar. The welding process utilizes powdered materials such as copper oxide and aluminum. The powdered material is placed in a crucible and ignited. Typically in electrical connections, the reduction of the copper oxide by aluminum produces molten copper and aluminum slag. Molten aluminum and molten iron can be made in similar fashion. The molten copper flows from the crucible over the parts to be welded contained in a mold, melting them and welding them together, forming a high quality low impedance connection. The slag forms on top and is removed. Such welding metals or powders, and a wide variety of molds and other related accessories are sold under the registered trademark CADWELD® by Erico Inc. of Solon, Ohio.

Most typically the molds are formed by two graphite blocks vertically split which are hollowed out to form the crucible, a receiving mold chamber for the pieces to be welded and interconnecting tap hole. The mold blocks are opened and closed by a toggle action handle frame or clamp which extends out to the side of the molds. Reference may be had to Burke U.S. Pat. Nos. 2,904,862 and 3,004,310 for illustrations of such exothermic cast welding mold assemblies. Where the mold parts are horizontally split, it is usual that the bottom of the block containing the crucible forms the top portion of the mold while the other or lower portion is hinged to separate from the top portion. The two mold blocks are also supported for opening and closing by a toggle clamp, again extending directly from the side of the mold blocks. The handles projecting laterally from the molds make the assemblies difficult to use in cramped quarters such as a narrow ditch where conductors for ground mats or other grounding systems, or cathodic protection connections, are often made.

Chain slings are typically used with mold assemblies for welding reinforcing bar such as shown in U.S. Pat. Nos. 3,234,603 and 3,255,498. In such patents the mold is in the form of a metal sleeve and separate molds are provided for the crucible and the tap hole or tundish, all of which may either be set one on top of the other or be held together by chain slings. The assembly and disassembly is time consuming, and more so in cramped quarters.

The molds are usually graphite or ceramic, and may be cleaned and reused. Properly handled, used and cleaned, molds may make fifty or more connections. However, improperly used or cleaned molds have to be replaced more often. Also, the molds have to be replaced or changed for different types of connections. There are literally dozens of types of connections and within each type of connection classification there are a wide number of conductor size variations. Also, the weld metal or powder is carefully pre-packaged by size. While the mold forming parts which receive the parts to be welded and which form the weld, need to be carefully designed and machined, that is not necessarily true of the crucible, and yet the crucible forms the largest portion of the mold system. Where the mold part and crucible are formed from a common block of graphite, excessive wear or damage to any part of the mold part requires that the whole thing be discarded even though the crucible is still usable. Accordingly it would be advantageous to have a system where the crucible was separate from the mold forming parts and the mold parts could be readily changed or substituted, while at the same time positioning the crucible and mold parts for quick and convenient cleaning for reuse.

If the crucible and mold are separable, it is important that when assembled they be held together with the proper degree of force so that no molten metal leakage occurs, and yet not too much force which might damage the mold parts, particularly if foreign matter is in the interface. It is also important that such force be quickly applicable or released, and readily adjustable.

It is also important that the jig or frame for holding the mold parts be low cost, able to separate and yet lock the mold parts quickly, and to hold the crucible for opening and closing travel with a mold part, and be properly held to such part so that no leakage occurs. It is also desirable that the crucible be easily removed and handled for convenient cleaning or preparation before assembly and clamping to the molds. In some situations, it may be desirable or even required to change crucibles. An example would be a crucible using a filter system for low emissions suitable for welding in confined spaces such as sold under the registered trademark EXOLON® by Erico, Inc.

It would also be important that the frame or clamp operate easily in tight quarters such as a ditch, and be self supporting. It would also be particularly advantageous if the frame or jig would partially open and hold the mold parts for insertion of the cable or parts to be welded, and fully open and hold the parts for cleaning. In cleaning a crucible, it is advantageous if a tool is inserted from the normally downwardly facing tap hole to knock any slag or residue out of the larger upper end of the crucible. In other words the crucible is best held inverted or upside down for cleaning.

Apparatus for making welds where two relatively thick conductors cross forms what is known as a lapped or cross connection. The molds for making this type of connection are complex, usually requiring two people to assemble for welding, and disassemble and clean. The molds comprise a bottom mold part forming part of the weld cavity and two vertically split molds forming both parts of the weld cavity and the crucible. Wear or damage to one part usually requires the whole assembly be replaced and a whole different set is required for each size.

SUMMARY OF THE INVENTION

A welding jig includes supports for two mold parts and a separable crucible. The mold parts may be open and closed with a toggle mechanism while the crucible is held in place by a separate toggle. The jig includes a vertically extending fixed handle about the size of a cane. The lower end includes a platform with barbs or spikes for planting in the earth or other surface so that the jig can be positioned to stand upright. A lower mold part is removably secured at the bottom of the handle with the formed mold surface facing upwardly. An elevator telescopes over and slides up and down on the handle. The lower end of the elevator includes a pivot supporting a crucible guide bar. Telescoped on the crucible guide bar is a crucible tube which includes a projecting handle and a support for a crucible. The crucible guide bar removably supports an upper mold part with the formed mold surfaces normally facing downwardly and in vertical alignment with the lower mold part.

The crucible tube and crucible guide bar are interconnected by a simple toggle pivoted to the guide bar and snapping into a seat in the form of a hook projecting from the crucible tube. The toggle is adjustable and effective to press the crucible against the upper mold part only when the mold part and crucible are mounted on the jig. When the toggle is released, the crucible, crucible tube and handle may be removed as a unit. This enables the crucible to be mounted and removed from the crucible tube when the latter is disassembled from the jig. It also provides the crucible with an assembly and manipulation handle.

The elevator is moved along the handle by a second toggle which includes a built-in friction brake in the form of Belleville washers to hold the elevator in all intermediate positions when released. This enables the operator to open the molds partially for conductor or insertion of other parts, or fully for removal, assembly or mold cleaning, without requiring one hand holding the molds open. When opened, using the handle of the crucible tube, the upper mold part and assembled crucible may be pivoted to an angular inverted position with the hinged cover on the crucible dropping clear of the inverted top of the crucible. In this manner the normally downwardly facing mold surface of the upper mold part is positioned for inspection and cleaning, and the communicating top mold and crucible chamber can readily be cleaned by inserting a tool downwardly through the now convenient and exposed passages. The top of the handle is provided with a grip which enables the jig to be moved and positioned readily and, which may actually act as a cane to facilitate the bending or stooping motion required when inserting the cable or parts to be welded.

Another aspect of the present invention is the two part mold for the welding of relatively thick heavy crossing members such as cable in what is known as a lapped or cross connection. These connections are frequently used to form grids in ditches or cramped or inconvenient locations. With a horizontally split mold with interfitting parts having in effect a parting surface at two different elevations, such lapped or cross or grid connections can much more easily be made. Diagonal sleeving and more uniform mold block size also make the molds easier to make and less costly while increasing their service life.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a side elevation of a jig and mold set prior to assembly in accordance with the present invention;

FIG. 2 is an elevation of the jig alone as seen from the right-hand side of FIG. 1;

FIG. 3 is a perspective view of the jig;

FIG. 4 is an elevation like FIG. 2, but with the molds assembled and closed;

FIG. 7 is a view similar to FIG. 6 but showing the crucible and upper mold part inverted for cleaning;

FIG. 8 is an exploded view like FIG. 6 but showing the crucible unlocked and disassembled;

FIGS. 15, 16 and 17 are perspective exploded views of other typical mold sets of the present invention.

DETAILED DESCRIPTION OF THE PREFERRED EMBODIMENTS

Figure 5:
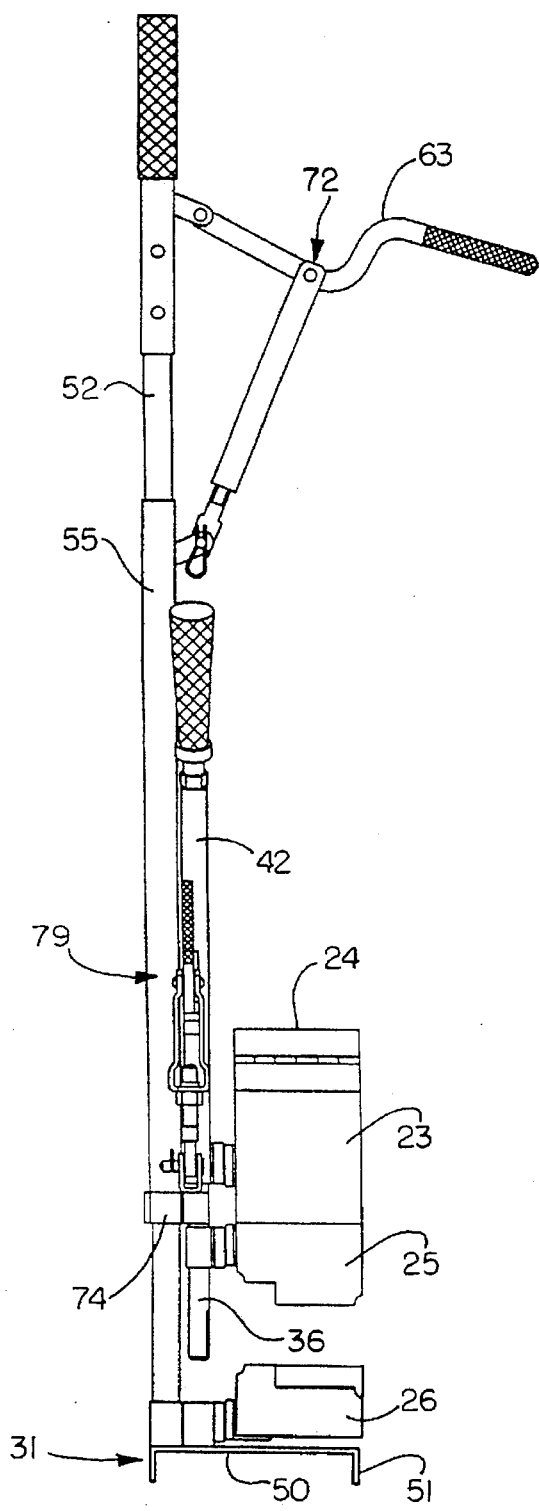
FIG. 5 is a side elevation showing the mold parts partially open.

Referring initially to FIGS. 1–8, there is illustrated a jig shown generally at 20 in accordance with the present invention which is designed to support and manipulate a refractory mold set shown generally at 21. As illustrated, the mold set comprises a crucible 23 having a hinged lid 24, and upper mold part 25, and a lower mating mold part 26. The mold parts and crucibles are made typically out of ceramic or graphite blocks with the various internal passages and chambers machined. The details of a mold set for forming lapped or cross welds are shown for example in FIGS. 11–14 while other mold configurations are shown in FIGS. 15–17. The actual configuration of such molds will be described subsequently.

The crucible and both mold parts are provided with horizontally extending fairly deep blind holes which receive paired studs projecting from the jig 20. As best seen in FIGS. 2 and 3, the studs 28 and 29 on which the lower mold part 26 is mounted project from plate 30 mounted on base 31. The upper mold part is mounted on studs 33 and 34 projecting from plate 35 mounted on crucible guide bar 36. The crucible 23 is mounted on studs 38 and 39 extending from plate 40 mounted on crucible tube 42 which telescopes over the crucible guide bar 36.

Also, as seen perhaps more clearly in FIGS. 2, 3 and 4, each of the plates 30, 35 and 40 is provided with an angle bracket seen at 44, 45 and 46, respectively, which accommodate thumb screws 47, 48 and 49 which enter relatively shorter holes in the side walls of the respective mold parts and crucible. With the thumb screws retracted, the mold parts and crucible are placed on the studs and properly seated. The thumb screws will not enter the relatively smaller holes unless the mold parts are properly seated. When the thumb screws are tightened, the mold parts are locked to the respective frames of the jig. In order to assure that the mold parts and crucible are assembled as they should be, the spacing of the studs and the receiving holes may vary slightly for each part.

In FIGS. 4–8, the mold parts are shown assembled to the jig. The figures illustrate the various movements and positions the mold parts and crucible may achieve with the present invention.

Referring back to FIGS. 1, 3 and 4, it will be seen that the base 31 includes a rectangular plate 50 which at each corner is provided with triangular barbed legs 51. Secured to the base and projecting upwardly from one edge thereof is an upwardly projecting tubular handle or post 52 which upwardly terminates in hand grip 53. The hand grip is at approximately the height of the top of a tall cane or approximately waist height of the user. The handle 52 and the base 31 are secured together and form an integral fixed unit and it is to the base that the lower mold part 26 is secured.

Telescoped on the handle 52 is a sliding tubular carriage or elevator 55. The tubular slide or carriage is moved vertically along the handle by a toggle mechanism shown generally at 57. This toggle mechanism is perhaps best illustrated in FIG. 3. Secured to and projecting from the handle near the grip 53 is an upper link clevis 60. A similar lower link clevis 61 is secured to the carriage or slide 55. Pivoted to the upper link clevis 60 is a lever handle 62 which includes an outwardly offset portion 63 terminating in hand grip 64. Pivoted to the link clevis 61 is an adjustment screw 66 threaded into the bight portion 67 of clevis 68. The two legs 69 and 70 of the clevis are pivoted to the lever handle 62 as shown at 72. The pivot 72 is shown in more detail in FIG. 10 and will be hereinafter described. In any event, by pulling the handle 62 away from the post 52 as seen, for example, in FIGS. 5 and 6, the slide or carriage 55 may be moved upwardly. When pushed back to the position seen in FIGS. 1 or 3, for example, pivot 72 moves over center between the upper and lower link clevis pivots locking the slide or carriage in the down position.

Figure 9:
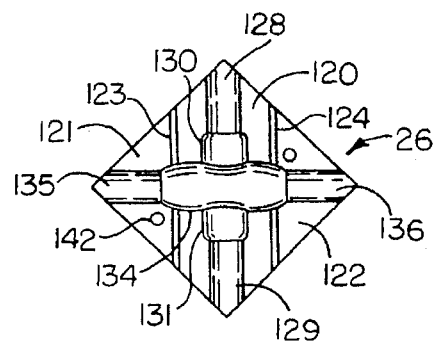
FIG. 9 is a somewhat enlarged fragmentary axial elevation of the pivot broken away and in section.

Referring now additionally to FIG. 9, it will be seen that the slide or elevator 55 at its lower end is provided with a pivot hub 74. The hub is simply welded to the side of the elevator as seen in FIG. 9 and accommodates a pin 75 which projects from bracket 76 which is secured to the crucible guide bar 36. The plate 35 from which the studs supporting the upper mold part 25 project also is secured to the crucible guide bar 36 as illustrated. The crucible guide tube 42 to which the plate 40 and crucible support are secured, telescopes over the upper end 77 of the crucible guide bar as seen more clearly in FIG. 8. The pivot 74–75 has stops limiting the pivot angle to approximately 300° to extend from a full upright position as seen in FIGS. 1–6 to the position seen in FIG. 7. It is noted that the pivot is offset both from the crucible guide 36 and the elevator 55 so that when the crucible guide is in a vertical or upright position, it is aligned with the vertical post or handle 52 and is directly in front of it as seen in FIG. 2. The upright or vertical alignment stop is seen at 78 in FIG. 2.

The crucible tube and guide, and thus the crucible and upper mold part are held together by a quick acting toggle shown generally at 79. The crucible tube 42 includes an angled handle 80 at its top and a hook 81 is secured to the side of the crucible tube. The hook provides a rounded seat for the rounded lower end 82 of toggle handle 83. The toggle handle is pivoted between the legs 84 and 85 of toggle clamp clevis 86. An adjustment screw 87 is threaded through the bight portion of the clevis and a jam nut 88 locks the adjustment in place. The adjustment screw is pivoted at 89 to link clevis 90 projecting from the bracket 76 as seen in FIG. 9. With the crucible supported by the crucible tube, and the upper mold supported by the crucible guide, the crucible tube is telescoped over the crucible guide and the toggle mechanism will lock the crucible to the top of the upper mold simply by pressing the handle 83 toward the crucible tube as seen in FIG. 2. The rounded lower end of the handle acts as a pivot and permits the upper pivot to rock over the point of contact between the lower end of the handle and the inside or seat of the hook. The clamp can be released simply by pulling the handle 83 away from the crucible tube and the handle and clevis will simply drop away.

Figure 10:
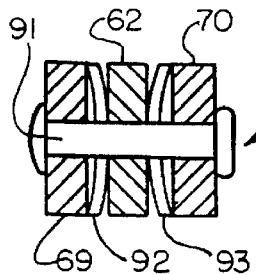
FIG. 10 is an enlarged section through the upper toggle pivot as seen from the line 10—10 of FIG. 6.

Referring now to FIG. 10, it will be seen that the pivot 72 is formed about a tubular rivet 91 which extends through the two legs 69 and 70 of the clevis with the handle 62 therebetween. Positioned on each side of the handle within the pivot are Belleville washers shown at 92 and 93 which create pressure at the pivot and which act as a friction or drag brake for the toggle system. Accordingly, if the operator moves the upper toggle 57 anywhere from the closed position seen in FIG. 4 to the full open position seen in FIG. 6, the carriage or elevator 56 including the crucible and upper mold supported thereby will remain exactly where it is released. Manual movement of the handle 63 is required to move the parts both up and down.

Operation

Figure 6:
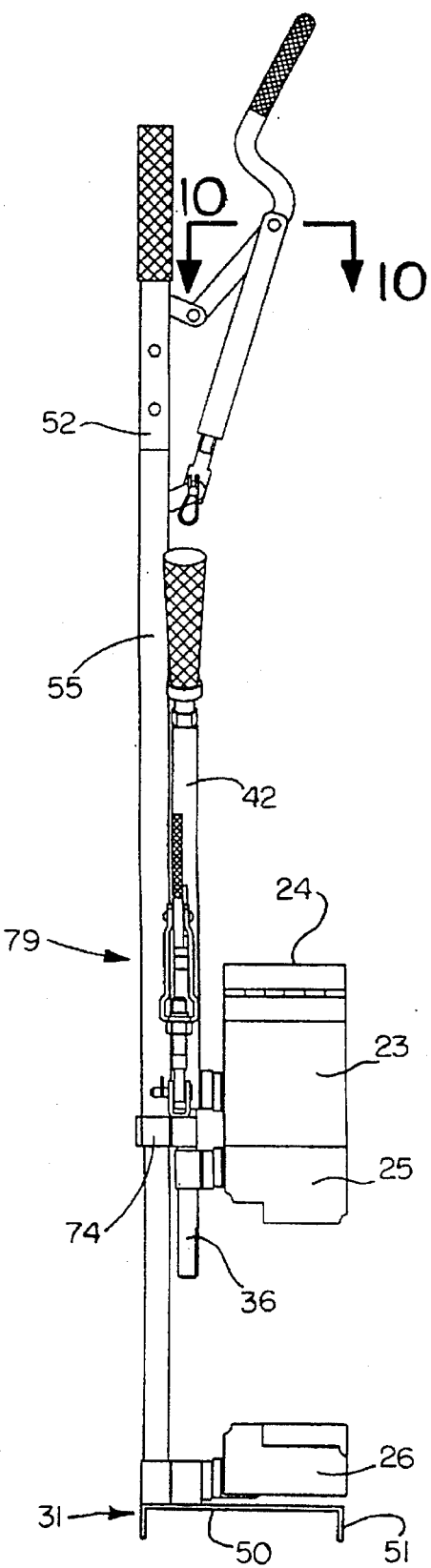
FIG. 6 is a similar view showing the mold parts fully open.

Initially the mold set seen in FIG. 1 will be assembled to the jig. As a matter of convenience, it is easier to assembly the mold components when the jig is opened and when the crucible tube 42 is separated from the crucible guide bar 36 as seen in FIG. 8. In any event, the mold components are properly assembled and seated on the base for the lower mold part, the crucible guide bar for the upper mold part, and the crucible tube for the crucible itself. The crucible tube with the crucible in place as seen in FIG. 8 is then telescoped over the crucible guide bar 36 and the toggle mechanism is employed to lock the crucible to the upper mold part as seen in FIG. 6. With the molds open as seen in FIG. 6, the operator may manipulate the entire jig simply by grasping the top handle 53. The grasping of the handle 53 moves the jig as a whole and not any of the mold parts with respect to each other. The operator using the handle may then place the jig in the bottom of a trench, for example, driving the legs or barbed feet 51 of the base into the soil. Then, using the handle 53 as a cane or aid, the operator then simply bends over to place an object to be welded in the proper sleeving of the bottom mold part. Before this is done, the operator may position the upper mold part and crucible at any elevation with respect to the bottom mold part. Normally simply sufficient clearance is obtained to insert the parts to be welded. Such position would be seen in FIG. 5.

If the mold parts are not quite properly positioned to receive the parts to be welded, the operator may readily reposition the jig simply by elevating it and moving it to another location. When the base barb legs are driven into the ground, the jig will stand in an upright position. If necessary, the operator may use both hands to position the parts to be welded. As the elevator moves downwardly, the lower end of the crucible guide bar 36 telescopes into a guide socket in the base 31 as seen in FIG. 1. With the parts in proper position, the mold parts are then closed simply by moving the toggle handle 63 in a clockwise direction as seen in FIG. 5. This moves the elevator 55 downwardly to close the mold parts on the parts to be welded. When the mold parts are properly closed on the parts to be welded as seen in FIG. 4, the operator charges the crucible with the exothermic material, closes the lid 24, and ignites the material. The igniting material creates the exothermic reaction which moves downwardly through the mixture melting a small steel disk at the bottom of the crucible permitting the molten metal to flow through a tap hole into the weld cavity surrounding the parts to be welded.

After the molten metal has sufficiently cooled, the operator then moves the handle 63 in a counterclockwise direction as in FIG. 5 which then elevates the upper mold part and crucible as a unit. Continued movement of the handle 63 to the position seen in FIG. 6 fully opens the mold parts. When the operator releases the handle, it will remain in any position. In the full open position, the operator may then grasp handle 80 and invert the crucible and the upper mold part to the position seen in FIG. 7. It is noted that the cover 24 is hinged at 94 to the crucible, such hinge being parallel to the axis of the pivot and on the leading top edge of the crucible as it is pivoted to the FIG. 7 position. In this manner, the cover 24 will drop to the vertical position seen clear of the top 95 of the crucible. With the upper mold part and crucible in the inverted position seen, the normally bottom surface of the upper mold part is exposed and the operator may readily clean both the upper mold part and the crucible by inserting a tool downwardly through the tap hole so that the slag or debris cleaned drops through the enlarged top hole of the crucible offset from the upwardly directed mold surface of the bottom mold part 26. When the weld is completed and the mold parts properly cleaned, the jig with the mold parts attached may readily be transported to the next welding site and the process repeated. If for some reason the crucible needs to be detached or serviced otherwise, it can readily be detached from the jig as indicated in FIG. 8 simply by releasing the toggle handle 83.

Molds

Referring initially to FIGS. 11–14, there is illustrated a mold system for producing a lapped or cross connection, which connections are formed where one cable or conductor passes over the top of another, usually at right angles to each other. Such connections are widely employed in the formation of grids used for grounding purposes and are usually formed with each cable or conductor in a ditch.

The crucible 23 includes an interior upwardly opening chamber 96 which funnels into a vertically extending tap hole 97. In accordance with conventional practice, the top of the tap hole is closed with a small steel disk, for example, and the exothermic materials are placed in the chamber 96. When the weld is to be made, the exothermic material is ignited to create the exothermic reaction. The material may be ignited through a starting powder on top of the material by a flint gun, or the top of the crucible may contain a filter and the ignition may be by an electrical spark or fuse.

The exothermic reaction normally proceeds downwardly through the charge of material in the crucible to form the molten metal which melts the steel disk permitting molten metal to flow downwardly through the tap hole and into the weld chamber below, while the slag forms on top.

The weld chamber is shown generally at 99 and is formed by the mating upper and lower mold parts. The upper mold part includes a tap hole 101 slightly larger than and in alignment with the tap hole 97. The vertical hole 101 communicates with a riser chamber 102. The riser chamber 102 communicates with semi-cylindrical chambers 105 and 106 seen in FIG. 14 extending symmetrically on each side thereof. Such chambers 105 and 106 communicate with part receiving semi-circular sleeve recesses 107 and 108 which extend to the diagonal corners 109 and 110 of the upper mold part 25. It is noted that the chambers or recesses 107, 105, 106 and 108 are formed in a surface 112 of the upper mold part which is recessed with respect to the surfaces 113 and 114. The surface 112 is formed in a diagonally extending groove and the side walls of that groove indicated at 116 and 117 are slightly inclined.

Figure 13:
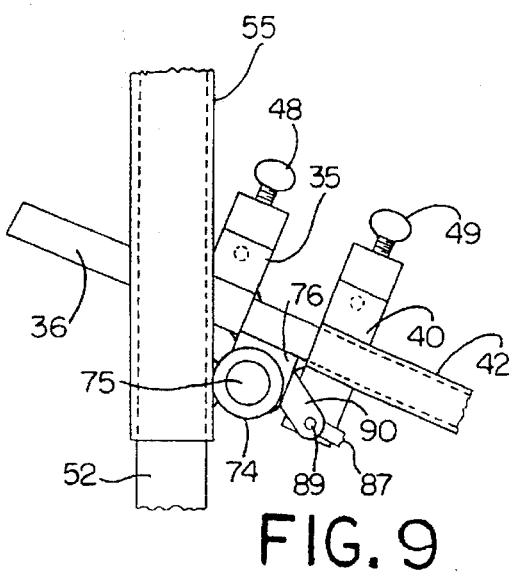
FIG. 13 is a plan view of the bottom mold at the parting surface as seen from the line 13—13 of FIG. 11.

Similarly, the upper surface of the bottom mold part seen in FIG. 13 includes a diagonally extending ridge having a surface 120 having an elevation higher than the surfaces 121 and 122. The transition between the two surface elevations is formed by rather steeply inclined surfaces 123 and 124. Aligned with the diagonally extending ridge are semi-circular recesses 128 and 129 which mate with the recesses 107 and 108, respectively, to form the sleeving around a cable or part to be welded.

Somewhat enlarged aligned semi-cylindrical recesses 130 and 131 form the opposite halves of the recesses 105 and 106, respectively. Such enlarged cylindrical recesses intersect with a transverse enlarged cylindrical cavity 134 which cuts through the middle of the ridge and which joins semi-cylindrical cavities 135 and 136 in the lower elevation surfaces 121 and 122, respectively. The recesses 135 and 136 mate with similar recesses 137 and 138 in the surfaces 113 and 114 of the upper mold part.

Figure 14:
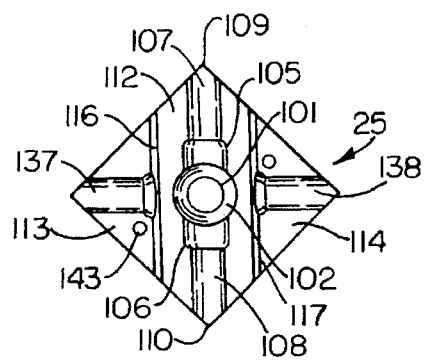
FIG. 14 is a similar plan view of the upper mold as seen from the lines 14—14 of FIG. 11.
Figure 11:
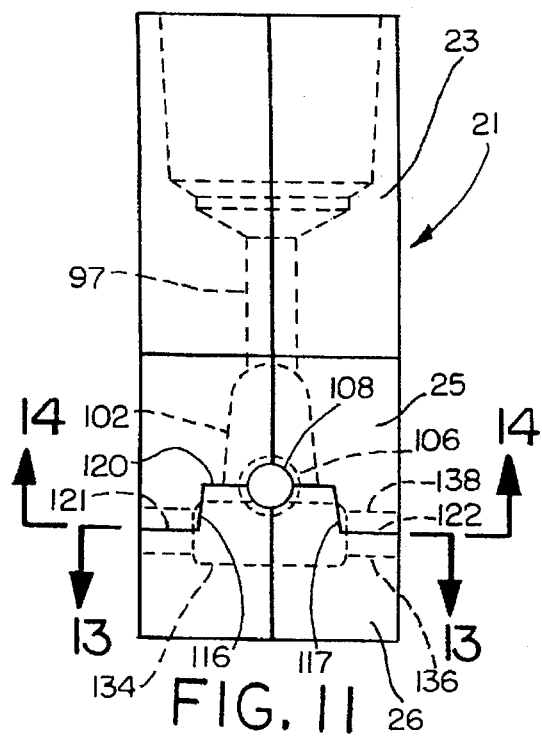
FIG. 11 is a corner elevation of a mold and crucible set for welding crossing members.
Figure 12:
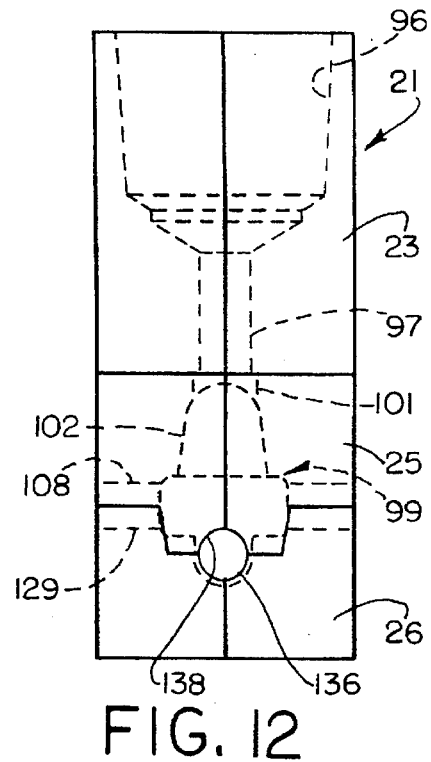
FIG. 12 is a corner elevation of the mold set as seen from the right-hand side of FIG. 11.

In order to assure the proper alignment of the complementary parting surfaces of the two mold parts, paired alignment pins or holes may be provided as indicated at 142 and 143. It is noted that the mold parts are generally square in horizontal section and aside from the parting surfaces at different elevations, are generally of the same height. This construction of the molds has a number of advantages. One of the advantages is that the sleeving seen at 128, 135, 129 and 136 in FIG. 13, and the mating surfaces in FIG. 14 are longer than they normally would be if the sleeving extended perpendicular to a side of the mold. Longer sleeving is obtained diagonally. Longer sleeving provides a better seal for the part to be welded, better support, and also less wear on the molds at the sleeving which forms the seal. Another advantage is the generally uniform overall dimension of the mold parts. This makes jigging and fixturing easier in the machines which are used to shape and cut the mold parts, resulting in higher speed production and lower cost.

Referring now to FIG. 15, there is illustrated a mold set which comprises upper and lower molds 150 and 151, respectively, for making a Tee splice or weld. The upper mold includes diagonally positioned axially aligned sleeving indicated at 152 and 153 which communicates with a central enlarged semi-circular cavity 154. Extending normal to the sleeving 152 and 153 is a further semi-circular sleeve 155 which extends from the intermediate corner of the mold to a semi-circular enlargement 156 which is axially normal to the enlargement 154. The top of the Tee cavity thus formed is provided with a riser chamber 157 communicating with the tap hole of the crucible.

The bottom mold part includes axially aligned diagonal sleeving 160 and 161 both of which communicate with somewhat enlarged cylindrical semi-circular chamber 162. Sleeving 164 extends from the intermediate corner to communicate with enlarged semi-cylindrical cavity 165 in communication with the cavity 162 forming the Tee weld chamber. When the parts are assembled, a conductor in the sleeving formed by the two mold parts at 155 and 164 may be welded to a conductor extending through the diagonal aligned sleeving. It will be appreciated that the mold of FIG. 15 may make a Tee splice or weld from either two parts or three parts. If three parts, the ends of all three parts must be positioned properly within the weld chamber.

In FIG. 16, there is illustrated upper and lower mold parts 168 and 169, respectively. The mold parts may be utilized simply to form a cable or like conductor butt splice weld. The upper mold part includes diagonally extending sleeving 172 and 173 communicating with central weld chamber 174 which in turn is in communication with riser chamber 175 communicating with the tap hole of the crucible 23. The top surface of the bottom mold 169 includes mating sleeving 177 and 178 communicating with the enlarged weld chamber 179. When the parts are positioned in and clamped by the sleeving and properly project into the weld chamber, a butt splice electrical connection can readily be made.

Although the embodiments of FIGS. 11–16 illustrate diagonal sleeving, it will be appreciated that the molds may be constructed so that the sleeving runs perpendicular to the sides of the mold rather than through the diagonal corners. One such mold set is illustrated in FIG. 17. The mold set seen in FIG. 17 may be employed to weld two parallel conductors together or may be employed to butt weld conductors together and conjoin such conductors concurrently. The upper mold 182 includes semi-circular sleeving extending perpendicular to the side of the mold communicating with weld chamber 185. On the opposite side of the weld chamber, sleeving sections 186 and 187 are in axial alignment with the opposite respective sections 183 and 184. The weld chamber includes an upwardly projecting riser chamber 188 in communication with the tap hole of the crucible 23.

The bottom mold part 183 includes semi-circular sleeving sections 190 and 191 communicating with enlarged weld chamber 192. Such sleeving sections are in axial alignment with sleeving sections 193 and 194 on the opposite side of the weld chamber. As indicated, the mold set depicted in FIG. 17 may weld together parallel conductors or butt weld concurrently one or two different conductors.

It is noted that FIGS. 15–17 illustrate pilot pins 196 and mating pilot holes 197. Such also illustrate the holes 198 in the mold parts and crucible for receiving the thumb screws 47, 48 and 49. The mold sets illustrated in FIGS. 11–17 are simply examples of molds which may be used with the jig and method of the present invention.

It can now be seen that there is provided welding apparatus which can quickly and conveniently be opened and closed and cleaned. With the simplified toggle mechanism 79, the crucible and upper mold part are mounted together and maintain tight contact. However, the toggle is quickly released to allow the crucible section to be removed independently and rapidly, and without being handled directly. When the jig is open by the toggle 57, the crucible and the upper mold part are pivotable for inversion to hold in proper position the parts for quick cleaning of the slag and other debris which remains after the exothermic reaction. This avoids a slow and uncomfortable holding of the individual parts for cleaning. Moreover, the jig when opened maintains the mold parts in the released position without slippage which is common with conventional handle clamps or toggle frames. The vertical configuration of the jig allows work to be performed down in narrow trenches and there are no horizontally projecting handle clamps which would interfere with this process and require wider trenches. The jig makes the connection more easily and the vertically extending handle may even be used as a cane to enable the installer to position the conductors with one hand while supporting himself with the other. Moreover, the frame or base is such that it can be mounted in soil or other surfaces without movement and will remain erect. While the mold parts may quickly be changed, it is even easier to change out the crucible for a different capacity or type of connection.

The three piece mold sets useful with the jig make the formation of lapped or cross connections much easier and more economical. Such molds also have longer service lives and may be made more economically.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A mold assembly for exothermic welding comprising a jig, a crucible, and two separate mold parts, said jig comprising a base adapted to support a first mold part, and a carriage adapted to support the second mold part and the crucible, and means to move said carriage to open and close said mold.

2. A mold assembly as set forth in claim 1 wherein said last mentioned means is operative to lock said carriage in said closed position.

3. A mold assembly as set forth in claim 2 wherein said last mentioned means includes a toggle to lock said carriage in said closed position.

4. A mold assembly as set forth in claim 1 wherein said base includes a vertically extending post, and said carriage is an elevator riding on said post.

5. A mold assembly as set forth in claim 4 including hold means to hold said elevator in raised position.

6. A mold assembly as set forth in claim 5 wherein said hold means comprises a friction brake.

7. A mold assembly as set forth in claim 6 wherein said friction brake comprises a Belleville washer.

8. A mold assembly as set forth in claim 7 including a toggle to lock said elevator in a lowered position, said Belleville washer being on a pivot of said toggle.

9. A mold assembly as set forth in claim 1 wherein said carriage is mounted for movement on a vertically extending jig handle.

10. A mold assembly as set forth in claim 9 wherein said base includes a bottom adapted to be embedded in the ground.

11. A mold assembly as set forth in claim 4 wherein said elevator includes means to turn said second mold part and said crucible to a substantially inverted position for cleaning when said elevator is in a raised position.

12. A mold assembly as set forth in claim 11 wherein said last mentioned means comprises a pivot substantially to invert said second mold part and crucible limiting the inversion to a position where the upper end of the crucible is directed at an angle to the opening movement.

13. A mold assembly as set forth in claim 12 wherein said pivot range is from about 280° to about 350°.

14. A mold assembly as set forth in claim 11 including a hinged cover on said crucible, the hinge axis of the cover being parallel to the axis of the pivot and on the leading edge of said crucible as said crucible is pivoted to the substantially inverted position.

15. A mold assembly as set forth in claim 14 wherein said hinge pivot is on one side of the crucible and the inversion pivot on the opposite side.

16. A mold assembly as set forth in claim 4 wherein said post includes a top handle at about the height of a walking cane.

17. A mold assembly as set forth in claim 1 wherein said carriage includes a support for the second mold part and a relatively movable crucible support.

18. A mold assembly as set forth in claim 17 including a releasable toggle to hold the crucible support to the carriage.

19. A mold assembly as set forth in claim 18 wherein said crucible support telescopes over said carriage, and said carriage pivots with respect to said base.

20. An exothermic welding jig comprising first and second mold parts, and a crucible, means to clamp the first and second mold parts about objects to be welded, and to clamp the crucible to the mold parts, and means to separate the first and second mold parts and then pivot the second mold part and crucible as a unit to an inverted position for cleaning.

21. A jig as set forth in claim 20 wherein said jig comprises a base and a vertically extending handle, said base supporting said first mold part.

22. A jig as set forth in claim 21 including support means for said second mold part mounted on said handle for movement therealong.

23. A jig as set forth in claim 22 including a crucible support mounted on said second mold support for movement therewith and with respect thereto.

24. A jig as set forth in claim 23 wherein said support means includes a pivot for inverting the second mold part and crucible when separated from the first mold part.

25. A jig as set forth in claim 22 including operating means interconnecting said handle and said support means for opening and closing the molds.

26. A jig as set forth in claim 25 wherein said operating means includes hold means to hold said support means in any open position.

27. A jig as set forth in claim 26 wherein said operating means comprises a hand operated toggle, and said hold means comprises a pivot stiffener to hold the toggle when released.

28. A jig as set forth in claim 27 including a toggle holding said crucible support to said support means and thus said crucible to said second mold part.

29. A jig as set forth in claim 21 including spike means extending from said base to assist the jig to stand upright.

30. An exothermic welding jig for supporting separate first and second mold parts, and a crucible, means to support said first mold part in a relatively fixed position, and means to support said second mold part and crucible for movement as a unit toward and away from said first mold part.

31. A jig as set forth in claim 30 including means to lock said first and second mold parts together with a predetermined force.

32. A jig as set forth in claim 30 including means to lock said crucible to said second mold part with a predetermined force.

33. A jig as set forth in claim 30 including means to invert said second mold part and crucible as a unit when moved away from said first mold part.

34. A jig as set forth in claim 30 including means to hold said second part and crucible at a selected position when moved away from said first mold part.

* * * * *